United States Patent Office 2,995,521
Patented Aug. 8, 1961

2,995,521
FOAM PRODUCING COMPOSITIONS
Jean Jacques Estignard-Bluard, 14 rue de
l'Embaracadere, Chantilly, France
No Drawing. Filed May 20, 1957, Ser. No. 660,088
Claims priority, application Luxembourg May 24, 1956
9 Claims. (Cl. 252—90)

My invention relates to improvements in foam forming compositions, that is to say, in compositions containing at least one foam forming agent, such as a soap, or more frequently a detergent, and which will form foam when agitated, with or without the addition of water.

In my French Patent No. 1,007,282 of March 15, 1948, I described a process and apparatus for obtaining gaseous emulsions, and especially foams, starting with a liquid, viscous or pasty medium.

According to the process described in this patent, the liquid medium which is to be foamed and a liquefied gas are brought together in a closed space. By "liquefied gas" is meant a fluid which is in a liquid state at the moment at which it is brought into contact with the liquid medium, but which becomes gaseous under the conditions of temperature and pressure intended to prevail at the conclusion of the process (atmospheric pressure and ordinary room temperature), and the mixture of this fluid and the liquid medium is poured out of the closed space through a throttle into the open air so that the fluid may spontaneously expand—and consequently pass from the liquid to the gaseous state—thereby forming with the liquid medium, a gaseous emulsion or foam.

The process may be carried into operation by means of an aerosol bomb or atomizer consisting of a receptacle, provided with an adjutage controlled by a manually adjustable valve member.

Such devices are relatively expensive, particularly by reason of the cost of the adjutage and its valve member, which must be manufactured with a certain precision and resist a certain pressure (of the order of 15 kg./cm.$^2$ in order to allow for possible high temperatures).

My invention seeks to alleviate this difficulty and relates on the one hand to foaming compositions having a consistency or viscosity which permits them to be marketed in flexible packages, such as metallic tubes, plastic containers, etc., and on the other hand to liquid foaming compositions which may be atomized by an atomizer of any conventional type.

The invention is intended to impart to such compositions the property of foaming spontaneously when they are spread out in a thin layer.

In other words, the object of my invention is to provide compositions which foam up of themselves when they are spread out in a thin layer.

It is particularly (but by no means exclusively) applicable to cosmetic compositions such as shaving creams, dentifirices, shampoos, and cleansing creams, to protective coverings such as coatings, attaching products such as adhesives, etc.

The object of the invention is also to produce a new article of manufacture consisting of a self-foaming composition which may be stored in a flexible tube and which, when spread out in a thin layer on a surface, will foam of itself, thereby increasing in thickness.

The invention is based on the surprising discovery which I made when I spread out an intimate mixture of a saponaceous composition (solution containing 10% triethanolamine oleate) and an organic liquid (pentane) which is insoluble in this composition, or nearly so. This was done at ordinary room temperature, or at a slightly higher temperature. When so applied, such a mixture foams spontaneously into the air in an unexpected manner, by evaporation of the organic liquid, although its vapor pressure at that temperature was considerably less than the pressure of the ambient air.

I then discovered that such a phenomenon takes place whenever the vapor pressure of the final composition has a high value, even though lower than the atmospheric pressure, at the temperature under consideration, provided that the initial composition is capable of foaming by conventional means, that is to say, by agitation, in the presence of air, this value of the vapor pressure being obtained by combining in an intimate mixture an organic liquid which is insoluble or only slightly soluble in the aqueous portion of the initial mixture, that is to say having a solubility therein not greater than 2 grams per 100 cm$^3$ of water, it being understood that the term "organic liquid" means either a single specific chemical or a mixture of several chemicals.

Two possible situations with respect to the initial foaming composition should be distinguished:

(1) If it contains only negligible quantities of free heavy fatty substances—such as Vaseline oil, lanolin, esters, free fatty acids—in which the additive may be soluble, the vapor pressure of the final composition will be substantially that of the additive (a little higher because of the presence of the water). It is thus possible to give formulas for additives which are independent of the initial composition. It is, of course, possible to include in the composition of the additive heavy fatty bodies which modify the vapor pressure of the volatile organic liquids, which permits the convenient adjustment of this vapor pressure to the most suitable value while simultaneously imparting desirable characteristics to the end product.

(2) If the starting composition contains substantial quantities of heavy fatty bodies, the vapor pressure of the final composition will then be lower than that of the additive and more volatile additives must be used to obtain the desired result, but the composition of these additives then depends on the nature of the starting foaming composition.

The foaming composition constituting my invention will ordinarily comprise 1 to 2 molecule-grams of organic liquid additive per kilogram of cream to be mixed with this liquid (ignoring the free fatty bodies). Of course, when the organic liquid additive is not a single chemical, it is necessary to consider the average molecular weight of the mixture.

At any rate, I have established that as a general rule, the foam develops much more rapidly when the layer is spread more thinly and when the mixing of the additive and the foaming composition is more thorough.

On the other hand, the development of the foam is also more rapid when the boiling point of the organic liquid is lower and the temperature of the surface is higher. In other words, the higher the vapor pressure of the final composition at a given temperature, the more rapidly the foam develops. But it should be emphasized that the foam develops at a vapor pressure below atmospheric pressure, which is completely paradoxical and distinguishes the present process from that described in the aforementioned French Patent No. 1,007,282. This has enabled me to define suitable values for the vapor pressure of the final composition. In order to provide a sufficiently rapid development of the foam at an ambient temperature between 15° C. and 20° C., it is necessary for the vapor pressure to reach a value of 1 kg./cm.$^2$ absolute at temperature equal to or lower than 55° C.

In order that the final composition may be marketed in the least resistant standard packages, for example, flexible aluminum tubes or plastic bottles, the vapor pressure may not be greater than 2.5 kg./cm.$^2$ absolute at 60° C., the temperature which must be considered in order to allow for the contingencies of storage and delivery. This implies—when the curve of normal vapor tensions as a function of the temperature for bodies of the type just cited is taken into consideration—that the vapor pressure of the composition will reach 1 kg./cm.$^2$ absolute at 30° C.

It is thus possible to prepare on demand self-foaming compositions which do not exert a substantial pressure on their packages or containers at ordinary ambient temperatures, and consequently, to employ flexible containers, such as conventional metallic tubes, or flexible or rigid atomizers to hold them. This results in a substantial saving as compared with the aerosol bombs ordinarily used to supply self-foaming compositions.

Among the organic liquids meeting the foregoing requirements which may be used as a major part of the additive composition are:

Hydrocarbons having 5 or 6 carbon atoms, for example, pentanes and hexanes and mixtures thereof;

Hydrocarbon fractions rich in hydrocarbons having 5 or 6 carbon atoms, for example, light directly distilled oil fractions, the fractions obtained by extracting gasoline from gases of petroleum origin or petroleum ether;

The halogen derivatives, and in particular the fluorochloro derivatives of the hydrocarbons, and still more particularly the fluorochloro derivatives of ethane and of propane, such as trichlorotrifluorethane (Freon 113).

When the container is an atomizer, the saponaceous composition is an aqueous solution of one or more soaps or other detergents and it is sufficient to introduce into the atomizer this liquid saponaceous composition, together with one or more organic liquids conforming to the foregoing limitations. Of course, if one or more of the organic liquids utilized are only slightly soluble, or insoluble in the saponaceous solution, it is necessary to agitate the atomizer before using it, in order to bring about a thorough mixing, generally an emulsion, which is then atomized by the atomizer. The spreading of a thin layer of the atomized mixture, with or without the addition of water, is then sufficient to develop an abundant foam.

On the other hand, when saponaceous compositions which have the consistency of a cream are being used (for example, shaving creams and toothpastes), I have established that, in order to avoid any separation of the organic liquid and the thick saponaceous composition during storage or use, it is preferable to thicken the organic liquid by means of a jellifying agent, such as aluminum octoate, in order to impart to jellified liquid a consistency or viscosity which is preferably intermediate between that of raw fresh egg whites and that of the thick saponaceous composition.

Another object of the invention is to provide a composition which is self-foaming when spread in a thin layer, and easy to manufacture and introduce into standard packages or vaporizers without applying substantial pressure, this composition comprising both the product to be transformed into foam (for example, an aqueous composition containing between about 5% and about 40% by weight of a detergent); at least one liquid which is either insoluble, or only slightly soluble in the aqueous portion of the product to be transformed into foam; this liquid having a boiling point (at atmospheric pressure) preferably between about 30° C. and 55° C. and a vapor pressure less than about 2.5 kg./cm.$^2$ absolute (at a temperature of 60° C.); and finally at least one jellifying agent in a proportion such that the jellified organic liquid has a viscosity somewhere between that of raw fresh egg whites and that of the product which is to be transformed into foam, when this product is thick and exhibits the consistency of a cream.

A further object of the invention is to provide an additive for thick foaming compositions designed to make them self-foaming, when spread into a thin layer. This additive comprised at least one volatile organic liquid which has been jellified to a consistency approximating that of raw fresh egg white, for example, by adding aluminum octoate in a proportion falling between about 0.4% and about 3% by weight.

With the compositions made according to the invention, in the case of compositions for use on the beard, a foam is obtained which has the appearance of the foam obtained with a brush, but without requiring the use of this utensil—a device which may carry germs.

Several examples showing how the invention may be carried out will now be described, purely by way of illustration, without in any way limiting the scope of the invention to the specific details thereof. In all of the examples, the proportions are given in percentages by weight.

(A) *Additives composed of two constituents*

Example 1: Percent
  Freon 114 (CClF$_2$—CClF$_2$)_____ 10
  Freon 113 C$_2$Cl$_3$F$_3$_____ 90
Example 2:
  Pentane N_____ 69
  Hexane N_____ 31
Example 3:
  Butane N_____ 3
  Freon 113_____ 97
Example 4:
  Pentane N_____ 40
  Freon 113_____ 60
Example 5:
  Butane N_____ 15
  Hexane N_____ 85
Example 6:
  Pentane N_____ 63
  Paraffin oil (molecular weight about 300)_____ 37

(B) *Additives composed of three constituents*

Example 7: Percent
  Freon 114_____ 12
  Freon 113_____ 65
  Paraffin oil (molecular weight about 300)_____ 23
Example 8:
  Pentane N_____ 66
  Hexane N_____ 14
  Paraffin oil (molecular weight about 300)_____ 20
Example 9:
  Pentane N_____ 37
  Freon 113_____ 48
  Paraffin oil (molecular weight about 300)_____ 15

In the mixtures containing paraffin oil, this oil may be replaced by another having, for example, a higher molecular weight, molecule for molecule, or even, subject to the same limitation, by another heavy fatty substance or mixture thereof, such as lanolin, the heavy esters, etc.

All these examples of additives are useful for initial foaming compositions which contain few or no free fatty substances; if the starting foaming compositions contain substantial quantities of these substances, the additives must be made more volatile by adding thereto small quantities of such substances as butane and/or Freons, for example, Freon 114 ($CClF_2$—$CClF_2$).

The foregoing additives are added to the starting foaming composition (to render it self-foaming) at the rate of 1 to 2 mol grams of volatile organic liquid, exclusive of the heavy fatty substances, per kilogram of this composition so that the additive of Example 2 will be added at the rate of 76 to 152 grams per kg. of cream; the additive of Example 9 at the rate of 129 to 258 grams per kilogram; and finally, if the additive consists of pure Freon 113, 188 to 376 grams must be added per kilogram of cream.

In accordance with the invention, in order to improve the stability of the final composition over the course of a long storage period, jellifying agent such as aluminum octoate may be added at the rate of 0.4% to 3% of the weight of the additive. Thus for the composition of Example 4 (pentane N—40%, Freon 113—60%), from 1 to 1.2 grams of aluminum octoate may be added.

(C) Self-foaming shaving creams

Example 10: An additive is prepared by mixing 80 grams of pentane N (of commercial purity) with 120 grams Freon 113. This mixture is jellified by incorporating therein 2.48 grams of aluminum octoate.

The additive thus obtained is thoroughly mixed with an ordinary shaving cream of the foaming type, having the following composition:

|  | G. |
|---|---|
| Cabbage palm oil | 60 |
| Coconut oil | 60 |
| Stearic acid | 250 |
| Potassium hydroxide | 70 |
| Glycerine | 150 |
| Lauryl sulfonate (30%) | 50 |
| Water | 360 |

Perfume as desired.

The self-foaming cream thus obtained may be stored in collapsible aluminum tubes having an individual capacity of about 100 grams. These tubes can easily stand a temperature of 60° C. At temperatures between 15° C. and 25° C. they are subjected to almost no interior pressure.

A shaving cream according to Example 10 is used as follows:

The face is covered with water which may be cold. About one cubic centimeter of this cream (or even less) is then spread rapidly over the face, by squeezing the tube in the usual manner. This spontaneously produces an abundant foam. The addition of water with the fingers is recommended.

Example 11: 121 grams of cyclopentane are jellified by adding 2.4 grams of aluminum octoate. The 123.4 grams of jellified additive thus produced are mixed with a cream having the following composition:

|  | G. |
|---|---|
| Triethanolamine stearate | 120 |
| Potassium stearate | 70 |
| Sodium stearate | 20 |
| Potassium soap of coconut oil | 20 |
| Glycerine | 60 |
| Water | 710 |
|  | 1000 |

Perfume as desired.

This self-foaming shaving cream is used in the same manner as the cream of Example 10, but hot, or at least warm, water should be employed with it.

Example 12: An additive is prepared in the same manner as Example 10 and mixed with the following foaming composition:

|  | G. |
|---|---|
| Free stearic acid | 16 |
| Potassium stearate | 323 |
| Potassium soap of coconut oil | 35 |
| Glycerine | 50 |
| Water, q.s.p.=up to | 1000 |

Perfume as desired.

The self-foaming shaving cream thus obtained may be used in the same way as that of Example 10, and preferably with warm water.

(D) Self-foaming toothpaste

Example 13: 57 grams of pentane are mixed with 143 grams of Freon 113 and 2.2 grams of aluminum octoate are added as a jellifying agent. 202.2 grams of an additive are obtained and mixed with a dental cream having the following composition:

|  | G. |
|---|---|
| Precipitated calcium carbonate | 350 |
| Neutral white soap | 200 |
| Powdered sugar | 100 |
| Talc | 100 |
| Glycerine | 50 |
| Water | 200 |

Perfume as desired.

The mixture of additive and dental cream is introduced into metallic tubes, and it has been established that tubes thus filled will stand temperatures of the order of 60° C. without rupturing.

(E) Self-foaming composition for the beard, adapted to be sprayed onto the face Example 14: 300 grams of stearic acid are mixed with 30 grams of fatty acids of coconut oil, and exactly saturated with commercial triethanolamine.

10 grams of this soap are then dissolved in 90 grams of soft water and 15 grams of normal pentane are added.

This mixture is placed in a squeeze-type atomizer.

In order to use it, the atomizer is first shaken and about 1 cubic centimeter of the mixture is sprayed onto the wet face. This is spread by the fingers into a thin layer which instantly produces an abundant lather.

All of the foregoing examples of additives may be used in foaming compositions containing few or no free fatty substances. If the foaming compositions contain substantial quantities of free fatty substances, the indicated additives must be rendered more volatile by adding thereto small quantities of butane and/or the lighter Freons such as Freon 114 ($CClF_2$—$CClF_2$).

It will of course be appreciated that the examples given may be modified as to details, and certain of the components replaced by equivalent substances without thereby departing from the basic principles of my invention as defined by the following claims.

What I claim is:

1. A composition which has a fixed specific volume when maintained in a thick body at ordinary room temperature and under atmospheric pressure, so that it may be packaged in non-pressure containers, but which is self-foaming at the same temperature and pressure when spread over a surface in a thin layer, said composition attaining a vapor pressure of 1 kg./cm.$^2$ absolute at a temperature not less than 30° C. and not greater than 55° C., and no greater than 2.5 kg./cm.$^2$ absolute at a temperature of 60° C., and consisting essentially of an intimate mixture of an aqueous saponaceous composition which is capable of foaming when agitated in the presence of air, together with an additive which is liquid at room temperature and atmospheric pressure but becomes gaseous under atmospheric pressure at a temperature not exceeding 55° C., said additive comprising at least one substance taken from the class consisting of saturated aliphatic hydrocarbons having more than 4 and less than 7 carbon atoms and trichlorotrifluoro ethane.

2. The composition of claim 1 containing also aluminum octoate as a jellifying agent in an amount equal to between 0.3% and 4% of said additive by weight.

3. The composition of claim 1 in which said additive has a maximum solubility in water which is less than 2 grams per 100 cm.$^3$.

4. The composition of claim 1 in which said aqueous saponaceous composition is a conventional shaving cream.

5. The composition of claim 1 in which said aqueous saponaceous composition is a conventional toothpaste.

6. The composition of claim 1 in which said additive contains also a minor proportion of dichlorotetrafluoroethane.

7. The composition of claim 1 in which said additive contains also a minor proportion of paraffin oil.

8. The composition of claim 1 in which said additive contains also a minor proportion of butane.

9. The composition of claim 1 in which the proportion of the additive to the aqueous composition is between 1 mol. gram and 2 mol. grams per kilogram.

References Cited in the file of this patent

UNITED STATES PATENTS 2,655,480   Spitzer et al. _____ Oct. 13, 1953

OTHER REFERENCES

The American Perfumer and Essential Oil Review, article by Harris, vol. 48, No. 11, November 1946, pp. 54–56.